(12) United States Patent
Clark et al.

(10) Patent No.: US 7,048,024 B2
(45) Date of Patent: May 23, 2006

(54) UNIDIRECTIONAL, MULTI-HEAD FIBER PLACEMENT

(75) Inventors: Randall R. Clark, Wichita, KS (US); Dwight L. Engwall, Haysville, KS (US); Mark G. Yonash, Derby, KS (US); Jeffrey A. New, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 362 days.

(21) Appl. No.: 10/646,316

(22) Filed: Aug. 22, 2003

(65) Prior Publication Data

US 2005/0039842 A1    Feb. 24, 2005

(51) Int. Cl.
*B65H 81/00*    (2006.01)
(52) U.S. Cl. .................. 156/425; 156/429; 156/430; 156/431; 156/432; 156/523; 156/574; 156/577
(58) Field of Classification Search ................. 156/425, 156/429, 430, 431, 432, 523, 574, 577, 433, 156/441
See application file for complete search history.

(56) References Cited

U.S. PATENT DOCUMENTS

| | | | |
|---|---|---|---|
| 3,783,060 A | 1/1974 | Goldsworthy et al. | |
| 4,097,572 A | 6/1978 | Walker et al. | |
| 4,574,029 A | 3/1986 | Murray et al. | |
| 4,867,834 A | 9/1989 | Alenskis et al. | |
| 6,073,670 A | * 6/2000 | Koury | ........................ 156/425 |
| 6,112,792 A | 9/2000 | Barr et al. | |

FOREIGN PATENT DOCUMENTS

| | | | |
|---|---|---|---|
| EP | 1342555 | | 9/2003 |
| FR | 1329371 | | 6/1963 |
| FR | 2579130 A1 | * | 9/1986 |

OTHER PUBLICATIONS

International Search Report, Feb. 16, 2005.

\* cited by examiner

*Primary Examiner*—Jeff H. Aftergut
(74) *Attorney, Agent, or Firm*—Shimokaji & Associates, P.C.

(57) ABSTRACT

An aircraft part manufacturing device for automated composite lay up includes a mandrel tool having a an interior mandrel surface that conforms to an outside mold line (OML) of a part: to be manufactured. One or more circular rings surround the mandrel and are attached to the mandrel. The circular rings rotate supported by bearings in a bearing cradle so that the mandrel rotates concentrically with the circular rings about an axis of rotation passing through the center of the circular rings. Multiple composite material delivery heads simultaneously deliver material directly to the outside mold line on the interior mandrel surface while the mandrel is rotated. A cantilever supported gantry beam supports the material delivery heads inside the interior mandrel surface. A connecting mechanism connects the material delivery heads to the gantry beam and provides motion of the material delivery heads relative to the interior mandrel surface.

22 Claims, 4 Drawing Sheets

UNIDIRECTIONAL, MULTI-HEAD FIBER PLACEMENT

BACKGROUND OF THE INVENTION

The present invention generally relates to fabrication of large composite structures and, more particularly, to automated composite lay-up of large aircraft fuselage sections.

The structural performance advantages of composites, such as carbon fiber epoxy and graphite bismaleimide (BMI) materials, are widely known in the aerospace industry. Aircraft designers have been attracted to composites because of their superior stiffness, strength, and radar absorbing capabilities, for example. As more advanced materials and a wider variety of material forms have become available, aerospace usage of composites has increased. Automated tape layer technology has developed to become a widely used automated process for fabrication of large composite structures such as wing panels and empennage. Current tape layer technology has been improved to offer flexibility in process capabilities required for a wide variety of aerospace components. As aerospace industry tape laying applications achieve material lay up rates, for example, that may help control the manufacturing cost of large composite structures, new and innovative applications for tape layers may be defined, such as the automated tape lay-up of large aircraft fuselage sections, for example, 15 to 20 feet in diameter.

Automated tape laying machines typically are gantry style machines that may have, for example, ten axes of movement with 5-axis movement on the gantry and 5-axis movement on the delivery head. A typical automated tape layer consists of a gantry structure (parallel rails), a cross-feed bar that moves on precision ground ways, a ram bar that raises and lowers the material delivery head, and the material delivery head which is attached to the lower end of the ram bar. Commercial tape layers are generally configured specifically for lay up of flat or mildly contoured laminate applications using either flat tape laying machines (FTLM) or contour tape laying machines (CTLM). On a gantry style tape layer, tobling (or a flat table) is commonly rolled under the gantry structure, secured to the floor, and the machine delivery head is then initialized to the lay up surface.

FIG. 1 provides an illustration of a typical tape laying machine material delivery head 100. Delivery heads for FTLM and CTLM machines are basically the same configuration as that of delivery head 100 shown in FIG. 1. The delivery heads on commercial automated tape layers are typically configured to accept material widths of 75 mm (3"), 150 mm (6"), and 300 mm (12"). Flat tape layers typically use material in 150 mm (6") and 300 mm (12") widths. Contour tape layers typically use material in 75 mm (3") and 150 mm (6") widths. CTLM systems normally use the 3" or 6" wide material when laying up off flat plane contour surfaces. Material 102 for tape layers generally comes in large diameter spools. The tape material 102 has a backing paper 106, which must be extracted as the prepreg (resin pre-impregnated fiber) is applied to the tool surface 108. The spool of material typically is loaded into the delivery head supply reel 104 and threaded through the upper tape guide chute and past the cutters 110. The material 102 then passes through the lower tape guides, under the segmented compaction shoe 112, and onto a backing paper take up reel 114. The backing paper is extracted and wound on a take up roller of paper take up reel 114. The delivery head 100 makes contact with the tool surface 108 and the tape material 102 is "placed" onto the tool surface 108 with compaction pressure. The tape laying machine typically lays tape on the tool surface 108 in a computer programmed path (course), cuts the material 102 at a precise location and angle, lays out tail, lifts delivery head 100 off the tool surface 108, retracts to the course start position, and begins laying the next course. The delivery head 100 may have an optical tape flaw detection system that signals the machine control to stop laying tape material 102 when a flaw has been detected. The delivery head 100 also typically has a heating system 116 that heats the prepreg materials to increase tack levels for tape-to-tape adhesion. Heated tape temperatures generally range from 80 F to 110 F.

Fiber placement is a similar process in which individual prepreg fibers, called tows, are pulled off spools and fed through a fiber delivery system into a fiber placement head, which is similar to delivery head 100 shown in FIG. 1. In the fiber placement head, tows may be collimated into a single fiber band and laminated onto a work surface, which can be mounted between a headstock and tailstock. When starting a fiber band or course, the individual tows are fed through the head and compacted onto a surface—such as surface 108. As the course is being laid down, the head 100 can cut or restart any of the individual tows. This permits the width of the fiber band to be increased or decreased in increments equal to one tow width. Adjusting the width of the fiber band eliminates excessive gaps or overlaps between adjacent courses. At the end of the course, the remaining tows may be cut to match the shape of the ply boundary. The head may then be positioned to the beginning of the next course. During the placement of a course, each tow is dispensed at its own speed, allowing each tow to independently conform to the surface 108 of the part. Because of this, the fibers are not restricted to geodesic paths. They can be steered to meet specified design goals. A rolling compaction device, combined with heat for tack enhancement, laminates the tows onto the lay-up surface 108. This action of pressing tows onto the work surface (or a previously laid ply) adheres the tows to the lay-up surface 108 and removes trapped air, minimizing the need for vacuum debulking. It also allows the fiber to be laid onto concave surfaces.

A fiber placement head, like the tape laying head, may be provided with several axes of motion, using an arm mechanism, for example, and may be computer numeric controlled. The axes of motion may be necessary to make sure the head 100 is normal to the surface 108 as the machine is laminating tows. The machine may also have a number of electronic fiber tensioners, which may be mounted, for example, in an air conditioned creel. These tensioners may provide individual tow payout and maintain a precise tension. The head 100 may precisely dispense, cut, clamp, and restart individual prepreg tows.

In the quest to automate the placement of composite materials at a high rate—to make the use of composites economical compared to conventional methods of fuselage fabrication—efforts have been focused at wrapping around a male mandrel, i.e. tool. Today's composite, fiber material placement processes and equipment have used male mandrels exclusively, wrapping tape layers on the outside surface of the tool—such as tool surface 108. One problem with this approach is that controlling the outside surface of the part—such as a fuselage section—is not possible without transferring the part to a female tool or clam shell type tooling.

Fuselage fabrication using composites also requires automated placement of composite materials at a rate high enough to make the use of composites economical compared to conventional methods of fuselage fabrication. The manufacture of very large fuselage parts economically, for example, will require composite material lay down rates that are significantly faster than those typical in the prior art. Prior art processes such as tape laying and fiber placement are currently too slow to be economically viable to meet production rates on new large scale aircraft programs, such as Boeing's 7E7. Tools and processes for automated placement of composite materials are needed that greatly increase the lay down rates over the state of the art, and which will reduce the number of machines required for a large scale manufacturing program.

As can be seen, there is a need for fabrication of composite parts using an automated lay-up machine that allows material placement to an outside mold surface, from inside a tool, allowing greater control and accuracy forming the exterior surface of the part. Also, there is a need for an automated lay-up machine that greatly increases the lay down rates, compared to the prior art, for economical composite fabrication of large diameter fuselage sections.

SUMMARY OF THE INVENTION

In one aspect of the present invention, a device for automated composite lay-up includes a tool having an axis of rotation. The tool includes a mandrel with an outside mold surface of a part to be manufactured. The outside mold surface is on the inside of the mandrel. The device also includes a circular ring surrounding the tool and the mandrel and concentric with the axis of rotation wherein the tool is rotated about the axis of rotation and composite material is delivered directly to the outside mold surface inside of the mandrel. The device includes a gantry beam disposed to access the inside of the mandrel; and multiple material delivery heads supported by the gantry beam. The gantry beam provides for movement of the multiple material delivery heads relative to the outside mold surface; and at least one of the multiple material delivery heads has an individually adjustable position relative to the outside mold surface.

In another aspect of the present invention, a device for automated composite lay-up includes a tool having a mandrel. The mandrel has an interior mandrel surface that conforms to an outside mold line of a part. At least one circular ring is attached to the tool, and the circular ring surrounds the tool and the mandrel. A bearing contacts the circular ring, and the circular ring rotates supported by the bearing so that the tool and the mandrel rotate concentrically with the circular ring about an axis of rotation passing through the center of the circular ring. A gantry beam is disposed to access the inside of the mandrel; and multiple material delivery heads are supported by the gantry beam. The gantry beam provides for movement of the multiple material delivery heads relative to the interior mandrel surface; and at least one of the multiple material delivery heads has an individually adjustable position relative to the interior mandrel surface.

In still another aspect of the present invention, a device for automated composite lay-up includes a tool having a mandrel and a circular ring having a center. The mandrel has an interior mandrel surface that conforms to an outside mold line of a part. The circular ring surrounds the mandrel and is attached to the mandrel. A bearing cradle includes a number of bearings, and at least one bearing contacts the circular ring. The bearing cradle supports the weight of the tool through the bearings. The circular ring rotates supported by the bearings so that the mandrel rotates concentrically with the circular ring about an axis of rotation passing through the center of the circular ring. A gantry beam is disposed to access the inside of the mandrel; and multiple material delivery heads are supported inside the mandrel by the gantry beam. The gantry beam provides for movement of the multiple material delivery heads relative to the interior mandrel surface; and at least one of the multiple material delivery heads has an individually adjustable position relative to the interior mandrel surface.

In yet another aspect of the present invention, an aircraft part manufacturing device for automated composite lay up includes a tool having a mandrel and a circular ring having a center. The mandrel has an interior mandrel surface that conforms to an outside mold line of a part. The circular ring surrounds the mandrel and is attached to the mandrel. A bearing cradle includes a number of bearings, and at least one bearing contacts the circular ring. The bearing cradle supports the weight of the tool through the bearings. The circular ring rotates supported by the bearings so that the mandrel rotates concentrically with the circular ring about an axis of rotation passing through the center of the circular ring, and the bearing cradle is moveable. A multiple number of material delivery heads deliver composite material directly to the outside mold line on the interior mandrel surface. A gantry beam is cantilever supported, and the gantry beam is moveable relative to the tool. The gantry beam supports the multiple material delivery heads inside the interior mandrel surface of the mandrel. A connecting mechanism connects at least one of the multiple material delivery heads to the gantry beam, so that: the connecting mechanism provides axial motion of the at least one material delivery head relative to the interior mandrel surface; the connecting mechanism provides motion of the at least one material delivery head relative to the interior mandrel surface in a direction normal to the interior mandrel surface; and the connecting mechanism provides rotation of the at least one material delivery head relative to the interior mandrel surface about an axis normal to the interior mandrel surface.

In a further aspect of the present invention, an aircraft part manufacturing device for automated composite lay up includes means for rotating a mandrel about a axis of rotation. The mandrel has an outside mold surface on the inside of the mandrel. The device also includes means for supporting a multiple number of material delivery heads inside the mandrel and simultaneously delivering composite material from the multiple material delivery heads at the outside mold surface.

In a still further aspect of the present invention, a method is disclosed for automated composite lay up on an interior mandrel surface of a tool having an axis of rotation. The mandrel has an outside mold surface on the inside of the mandrel. The method includes rotating the mandrel about a axis of rotation; supporting a multiple number of material delivery heads interior to the outside mold surface; and placing a composite fiber material inside the mandrel onto the outside mold surface simultaneously from the multiple material delivery heads.

These and other features, aspects and advantages of the present invention will become better understood with reference to the following drawings, description and claims.

DETAILED DESCRIPTION OF THE INVENTION

Figure 1:
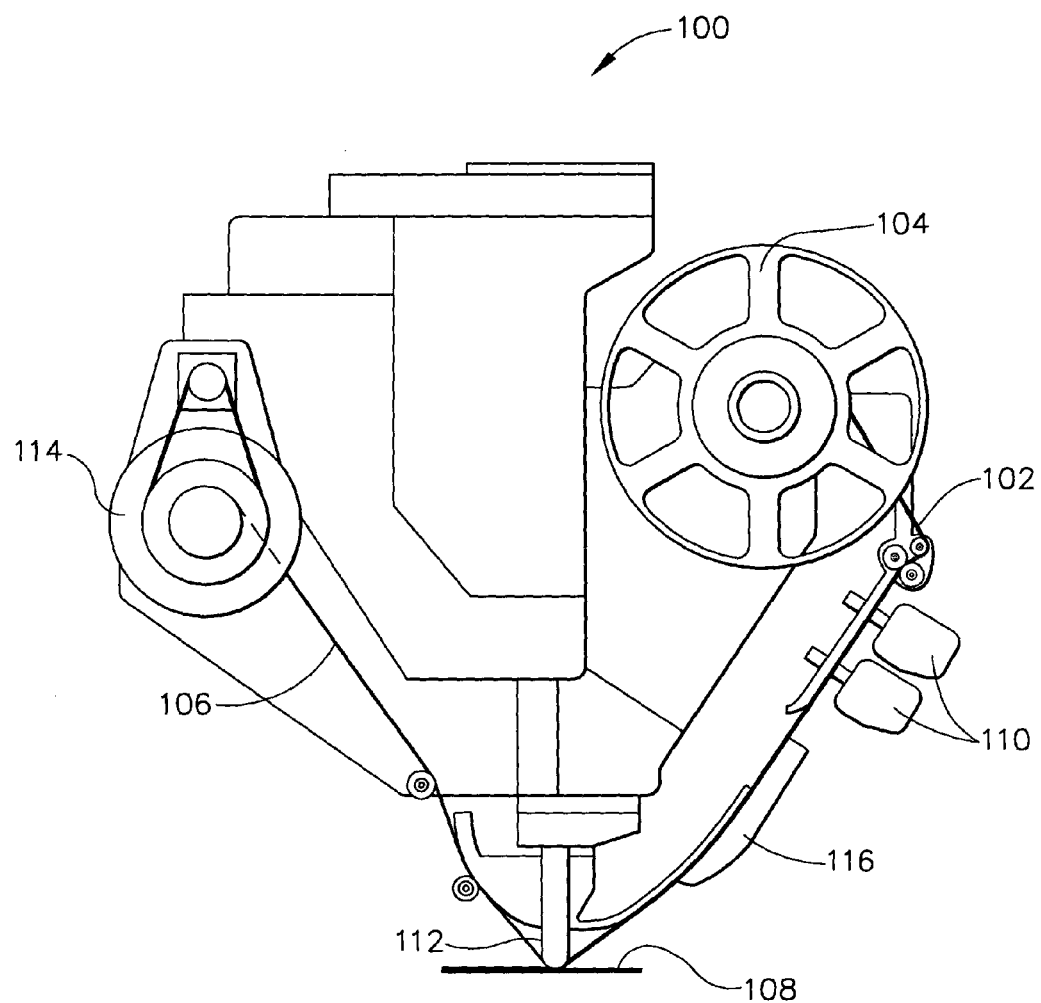
FIG. 1 is a diagram of a typical tape laying machine material delivery head, as known in the art.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, one embodiment of the present invention provides fabrication of parts made of composite materials, which may be used, for example, in the manufacture of commercial and military aircraft. In one embodiment, an automated lay-up machine allows material placement directly to an outside mold surface and eliminates prior art techniques of expansion and transfer of the part to another tool, allowing greater control and accuracy over the prior art in forming the exterior surface of the part and resulting in less defects and higher surface quality compared to parts fabricated according to the prior art. In one embodiment, the present invention enables the automated lay down and compaction of large quantities of high performance composite materials onto large cylindrical shaped mandrels (typically greater than 15 feet in diameter) at very high rates compared to the prior art. In one embodiment, an automated lay-up machine may be ideally suited for composite fabrication of fuselage sections having large diameter, for example, from 15 to 20 feet.

In one embodiment, multiple automated lay-up machines (material delivery heads) may place the composite materials directly to the outside mold surface from inside the tool. Such operation would be difficult for prior art fuselage fabrications—such as Premier I and Horizon business jets made by Raytheon, Inc.—because of the relatively small diameter of the business jet fuselage, which may necessitate conventional outside lay-up using a male mandrel. Automated tape and fiber lay-up equipment and gantry beam could easily fit, however, within a large commercial aircraft fuselage, for which the diameter could reach in excess of 20 feet. In addition, alternative embodiments of the present invention allow for orientation of the mold or lay-up mandrel at any angle or attitude, for example, horizontal, vertical, or tilted, that may facilitate the fabrication of long fuselage sections that may be in the range, for example, of 30 to 40 feet or more in length. In addition, the multiple delivery heads of one embodiment allow for fast material build up from outside mold line (OML) to inside mold line (IML) at rates that are economical for the production of large fuselage sections.

Because use of the tool of one embodiment eliminates prior art techniques of building on a male mandrel and transferring to a female mandrel tool, the problems inherent in such prior art techniques may be avoided. For example, using prior art tools and processes, graphite or other fibers wrapped in the hoop direction around a fuselage do not allow the composite to expand out and conform properly to the female tool, creating difficulty for expanding the part, so that the part does not make proper contact with, or conform to the female tool. Parts made using an embodiment of the present invention may be expected to be of higher quality and have fewer exterior surface defects because the prior art need to expand the part has been eliminated, eliminating those problems associated with the prior art fabrication tools and techniques.

Figure 2:
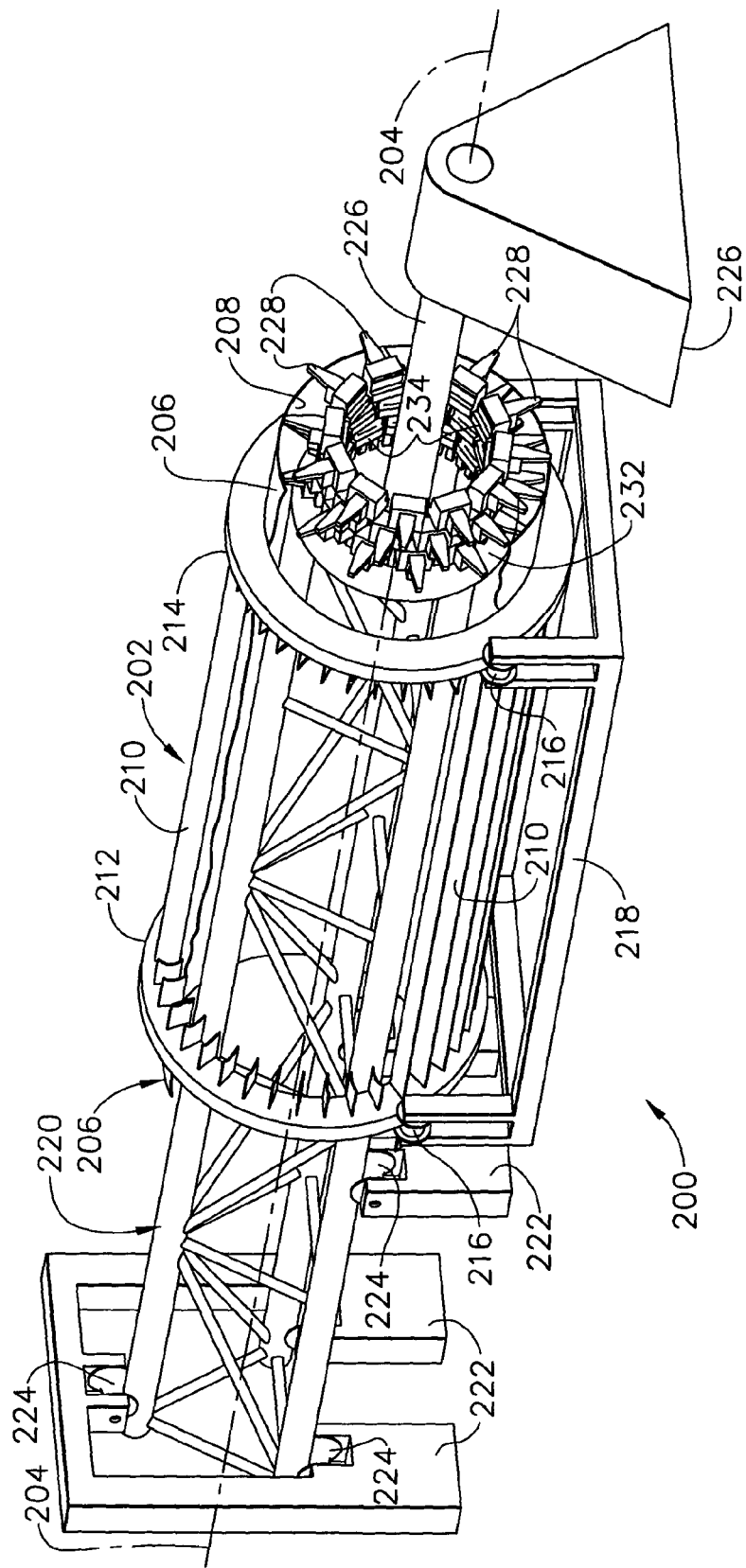
FIG. 2 is a perspective illustration of an aircraft part manufacturing device for automated composite lay up, according to one embodiment of the present invention.

Referring now to the figures, wherein like items are referenced with the same numerals, and in particular, referring to FIG. 2, an aircraft part manufacturing device 200 for automated composite lay up is illustrated in accordance with one embodiment. Device 200 may include a tool 202 that may have an axis of rotation 204. Tool 202 may be situated so that axis of rotation 204 is placed at any desirable angle or attitude relative to horizontal. The example embodiment illustrated in FIG. 2 shows a horizontal configuration of device 200 in which the attitude of axis of rotation 204 may be horizontal or nearly horizontal, as shown in FIG. 2, or also may be tilted. Other configurations and attitudes, however, are contemplated. For example, FIG. 6 shows one possible configuration in which axis of rotation 204 may be placed vertically or at attitudes closer to vertical than may be practical with the configuration shown in FIG. 2. Tool 202 may have a mandrel 206, which may be approximately cylindrical, or symmetrical about axis of rotation 204. Mandrel 206 is shown in cut away view in FIGS. 2 through 4 to aid viewing other parts of the drawings. The inside of mandrel 206 may have an interior mandrel surface 208, which may conform to an outside mold surface or an outside mold line (OML) of an aircraft part to be manufactured. Interior mandrel surface 208 may also be referred to as the "outside mold surface" or "OML". Tool 202 may include stiffeners 210 that provide extra strength and stiffness to support outside mold surface, i.e., interior mandrel surface 208, of mandrel 206 while adding a minimal amount of extra weight to tool 202.

Device 200 may include circular rings 212 and 214, which may be integral with tool 202 or may be attached to tool 202. Stiffeners 210 may also attach to circular rings 212 and 214 to provide extra integrity of circular rings 212 and 214 with tool 202. Circular rings 212 and 214 may attach to stiffeners 210 as well as to mandrel 206 to provide extra strength and rigidity of the attachment of circular rings 212 and 214 to mandrel 206 of tool 202. Circular rings 212 and 214 may be in contact with bearings 216, which may support rotation of tool 202 and mandrel 206. Circular rings 212 and 214 may surround tool 202, and mandrel 206, and may be concentric with axis of rotation 204 so that rotation of circular rings 212 and 214 on bearings 216 rotates mandrel 206 about its axis of rotation 204. In other words, circular rings 212 and 214 rotate supported by bearings 216 so that mandrel 206 rotates concentrically with circular rings 212 and 214 about an axis of rotation 204 passing through the center of circular rings 212 and 214. Bearings 216 may be held by a bearing cradle 218 that may support the weight of tool 202, including mandrel 206 and circular rings 212 and 214, through the bearings 216. Bearing cradle 218 may be moveable, for example, to provide transport of tool 202 and the part being manufactured from one stage of a manufacturing process to another.

Device 200 may also include a gantry beam 220 disposed to access the inside of the mandrel 206. Gantry beam 220 may be cantilever supported, for example, by cantilever supports 222. Cantilever supports 222 may be fitted with rollers 224. Gantry beam 220 may be supported as a cantilever beam using rollers 224 so that gantry beam 220 is moveable relative to tool 202. Gantry beam 220 may be further supported by a tail stock 226 so that gantry beam 220 becomes either fully supported as a beam between tail stock 226 and cantilever supports 222 or becomes partially cantilever supported by cantilever supports 222 and partially supported as a beam between tail stock 226 and cantilever supports 222. Tail stock 226 may, for example, also be fitted with rollers—such as rollers 224—or may otherwise be made to "telescope"—so that gantry beam 220 remains moveable relative to tool 202 when tail stock 226 is connected to gantry beam 220 for support. Tail stock 226 may be removable from gantry beam 220 and moveable so that tool 202 may be removable from gantry beam 220, for example, as tool 202 may be moved from one stage of a manufacturing process to another.

Device 200 may further include multiple composite material delivery heads 228. Material delivery heads 228, for example, may be similar to material delivery head 100, such as a flat tape laying machine, contour tape laying machine, or fiber placement head. Material delivery heads 228, for example, may be adaptations of an existing delivery heads, such as a tape laying or fiber placement heads, as needed to meet surface contour requirements, as the contour of interior mandrel surface 208 may vary widely depending on the aircraft part which aircraft part manufacturing device 200 is being used to manufacture. For example, tape laying heads may be used for material delivery heads 228 when the tool 202 and interior mandrel surface 208 cross sections remain mostly constant, as seen in FIG. 2. By the same token, fiber placement heads may be more suitable for use for material delivery heads 228 when the cross sections of tool 202 and interior mandrel surface 208 change significantly along the length of the tool 202, for example.

The multiple material delivery heads 228 may be supported interior to the interior mandrel surface 208 inside of mandrel 206, as shown in FIG. 2, so that balanced pressure may be exerted by multiple material delivery heads 228 in opposing directions inside mandrel 206 to aid in the delivery of composite material to interior mandrel surface 208. Composite material may be delivered simultaneously in multiple courses directly to the outside mold line on the interior mandrel surface 208. For example, gantry beam 220 may support multiple material delivery heads 228 inside interior mandrel surface 208 of mandrel 206, so that composite material is delivered directly to the outside mold surface on the inside of mandrel 206.

Device 200 may include one or more connecting mechanisms 232 that may connect one or more material delivery heads 228 to gantry beam 220. Connecting mechanism 232 may provide axial motion relative to interior mandrel surface 208, i.e., motion in a direction parallel to axis of rotation 204, of one or more material delivery heads 228 along gantry beam 220. Device 200 may also include arm mechanisms 234 that may connect each material delivery head 228 to gantry beam 220 or to connecting mechanism 232. Arm mechanisms 234 may provide motion of material delivery heads 228 relative to the outside mold surface, i.e., interior mandrel surface 208, of mandrel 206. Connecting mechanism 232 and arm mechanisms 234 are further described below.

In operation, material delivery heads 228 may translate along the entire length of the tool 202 while tool 202 rotates, allowing the material delivery heads 228 to simultaneously place material in multiple courses over the entire tool surface, i.e., interior mandrel surface 208. The multiple courses of composite material may be laid down in various patterns on interior mandrel surface 208 depending on the relative motion between material delivery heads 228 and tool 202. Gantry beam 220 may provide an axial motion of material delivery heads 228, for example, by movement of gantry beam 220 using rollers 224, as described above. Alternatively, gantry beam 220 may be supported at one end by tail stock 226 during operation of material delivery heads 228, and connecting mechanism 232 may provide an axial motion of material delivery heads 228 by moving material delivery heads 228 along gantry beam 220.

At the same time, tool 202 may or may not be rotated. For example, if material delivery heads 228 are held stationary while tool 202 is rotated, courses of composite material may be laid down in a circumferential, or hoop, direction on interior mandrel surface 208. Also for example, if material delivery heads 228 are moved axially while tool 202 is held stationary courses of composite material may be laid down in an axial direction on interior mandrel surface 208. If both the multiple material delivery heads 228 are moved axially while tool 202 is rotated, courses of composite material may be laid down in a helical pattern, with the helix angle depending on the relative velocities of motion and rotation.

Material delivery heads 208 may be controlled in coordination with the rotation of tool 202, mandrel 206, and interior mandrel surface 208, for example, by using existing numerical control (NC) or computer numerical control (CNC) programming software to control the material delivery heads 208 and tool 202 simultaneously. For example, rotation of tool 202 may be driven through bearings 216 using CNC control coordinated with CNC control of the material delivery heads 208.

Figure 3:
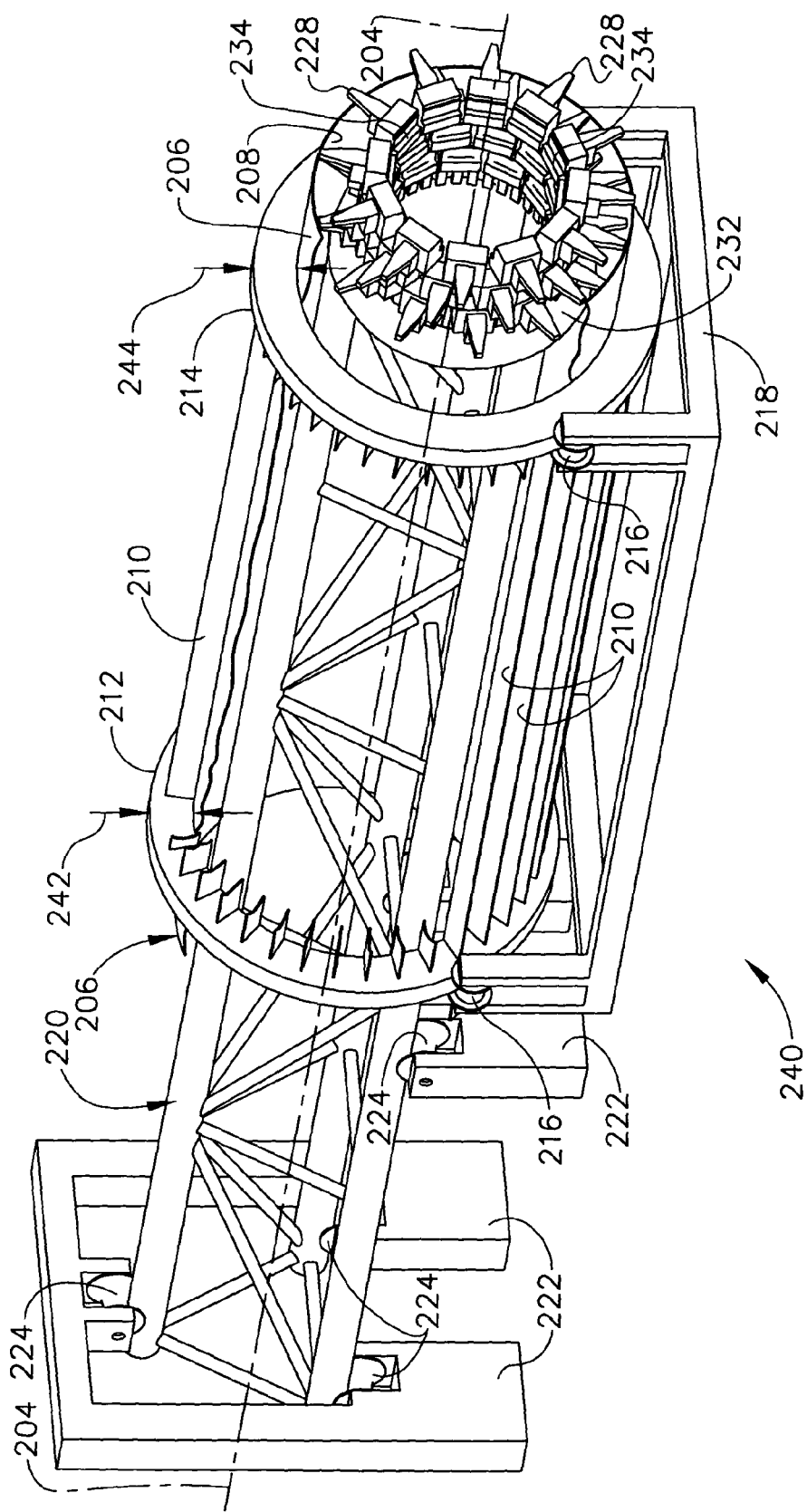
FIG. 3 is a perspective illustration of an aircraft part manufacturing device for automated composite lay up, according to another embodiment of the present invention.

Referring now to FIG. 3, an aircraft part manufacturing device 240 for automated composite lay up is illustrated in accordance with another embodiment. Interior mandrel surface 208 of mandrel 206 of tool 202 may have a non-constant cross section. Mandrel 206 is shown in cut away view in FIG. 3 to aid viewing other parts of the drawing. When mandrel 206 has a non-constant cross section, circular ring 214 may have a different thickness 244 than thickness 242 of circular ring 212. Thus, the thicknesses 242, 244 of circular rings 212, 214 may be used to compensate for a mandrel 206 having non-constant cross sections so that when circular rings 212 and 214 are rotated supported by bearings 216, mandrel 206 may rotate concentrically with circular rings 212 and 214 about an axis of rotation 204 passing through the center of circular rings 212 and 214.

Device 240 may include one or more connecting mechanisms 232 that may connect material delivery head 228 to gantry beam 220. Material delivery head 228 may be a fiber placement head, for example, to aid in the laying down of material on mandrel 206 when the contours of mandrel 206 are more complex than a constant cross section mandrel. Connecting mechanism 232 may provide axial motion of multiple material delivery heads 228 relative to interior mandrel surface 208 and may also provide motion of material delivery heads 228 along gantry beam 220 if gantry beam 220 is held stationary during operation of material delivery head 228, for example, using tail stocks such as tail stock 226 shown in FIG. 2. Connecting mechanism 232 also may provide individual axial positioning adjustment of each of multiple material delivery heads 228 relative to interior mandrel surface 208, and independently of and relative to the other material delivery heads 228.

Independent axial position adjustment would be useful, for example, when placing plies of material in the circumferential direction, or hoop direction of the cylinder of tool 202. In this case, all, or some of the heads 228 might reposition themselves relative to each other axially, along the length of the tool 202, so that the bands, i.e., courses, of material placed would be adjacent to each other without overlap or gaps, when placed onto the tool 202 or interior mandrel surface 208.

Connecting mechanism 232 also may provide individual motion of each of material delivery heads 228 relative to interior mandrel surface 208 in a direction normal, i.e. perpendicular, to interior mandrel surface 208. Connecting mechanism 232 also may provide individual rotation of each of material delivery heads 228 relative to interior mandrel surface 208 about an axis normal to interior mandrel surface 208.

Device 240 may also include arm mechanisms 234 that may connect material delivery heads 228 to gantry beam 220 or to connecting mechanism 232 as shown in FIG. 3. Arm mechanisms 234 may provide individual, i.e., independent of the other material delivery heads 228, motion of each material delivery head 228 relative to interior mandrel surface 208 in a direction normal to interior mandrel surface 208. Arm mechanisms 234 also may provide individual rotation of each material delivery head 228 relative to interior mandrel surface 208 about an axis normal to interior mandrel surface 208. Arm mechanisms 234 also may provide individual motion or position adjustment of each material delivery head 228 relative to interior mandrel surface 208 in an axial direction relative to interior mandrel surface 208. Arm mechanisms 234 also may provide individual motion or position adjustment of material delivery heads 228 relative to interior mandrel surface 208 in a circumferential, or hoop, direction relative to interior mandrel surface 208.

Figure 4:
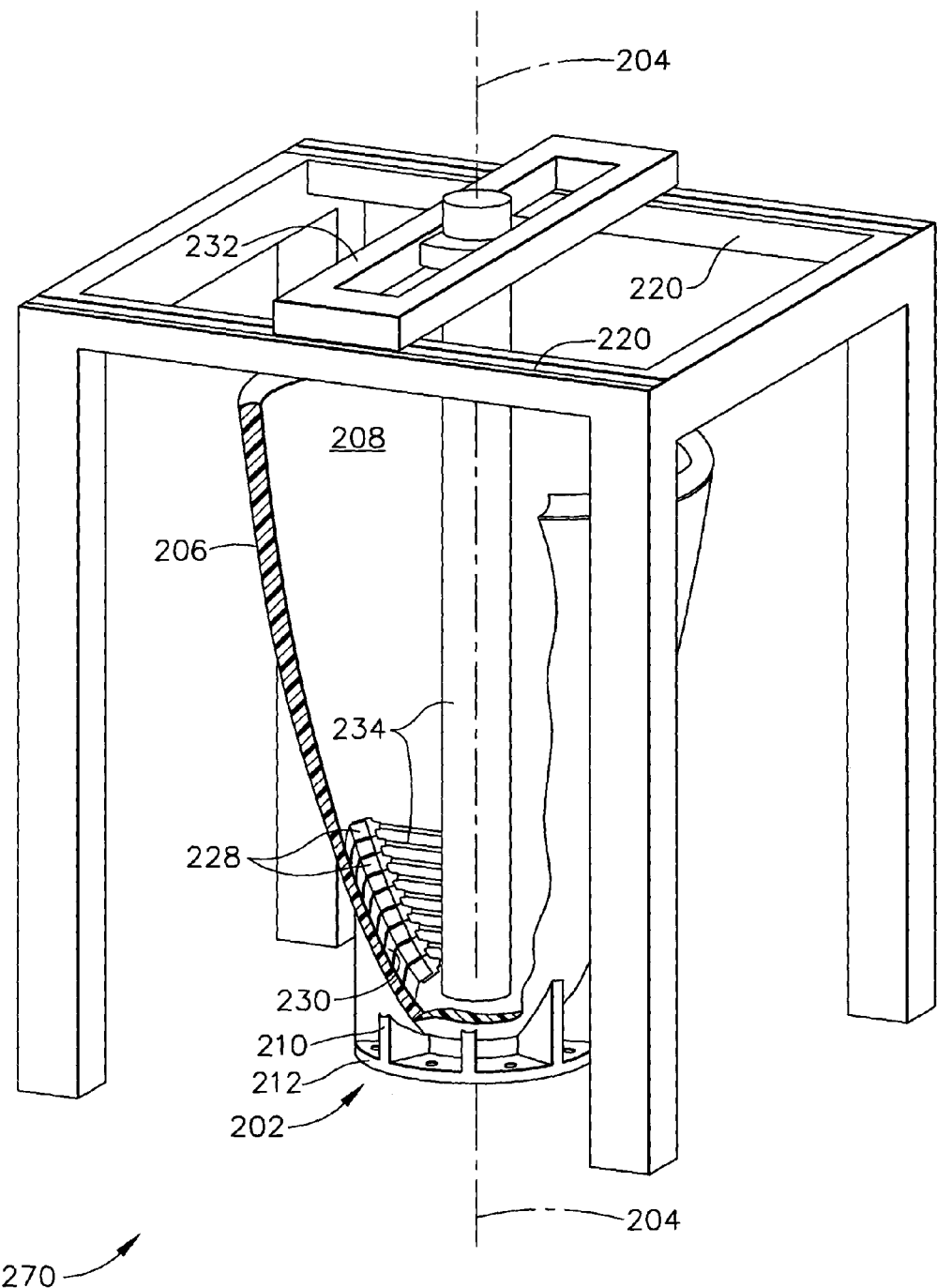
FIG. 4 is a perspective illustration of an aircraft part manufacturing device for automated composite lay up, according to yet another embodiment of the present invention.

FIG. 4 illustrates another embodiment of an aircraft part manufacturing device 270. FIG. 4 shows material delivery head 228 laying a course 230 of composite material to an OML at an interior mandrel surface 208 of a mandrel 206 of a tool 202. Tool 202 may include a ring 212 supported on bearings. As shown in FIG. 4, material delivery head 228 may be supported above interior mandrel surface 208 by a gantry beam 220. Connecting mechanism 232 may provide axial motion and positioning of material delivery head 228 along gantry beam 220 and may support and connect arm mechanism 234 to gantry beam 220. Arm mechanism 234, as described above, may provide motion of material delivery head 228 relative to interior mandrel surface 208 in a direction normal to interior mandrel surface 208, i.e., up and down relative to interior mandrel surface 208 and at an oblique angle with respect to horizontal as seen in FIG. 4. Arm mechanism 234, as described above, may also provide rotation of material delivery head 228 about an axis normal to interior mandrel surface 208; motion in an axial direction relative to interior mandrel surface 208; and motion in a circumferential, or hoop, direction relative to interior mandrel surface 208.

A method for automated composite lay up on an interior mandrel surface—such as interior mandrel surface 208 of mandrel surface 206 of tool 202—may include rotating the mandrel about an axis of rotation—such as axis of rotation 204—which may have any angle or attitude including, for example, horizontal, vertical, and tilted. The interior mandrel surface may conform to the outside mold surface, or OML, of a part to be manufactured. The method may also include supporting multiple, i.e., two or more, composite material delivery heads—such as multiple material delivery heads 228, which may be composite tape laying machines or fiber placement heads, for example. The method may include supporting the multiple composite material delivery heads interior to the interior mandrel surface inside the mandrel and placing composite fiber from the multiple material delivery heads simultaneously onto the interior mandrel surface, i.e., onto the outside mold surface of the part.

The method may also include rotationally supporting the mandrel on a bearing in contact with a circular ring surrounding the mandrel—such as bearings 216 contacting circular rings 212 and 214 surrounding and supporting mandrel 206. The method may include supporting the bearing in a bearing cradle and supporting the weight of the mandrel, the tool, and the circular ring using the bearing cradle.

The method may also include supporting the multiple material delivery heads from a gantry beam—such as gantry beam 220—and supporting one end of the gantry beam using a tail stock—such as tail stock 226. The method may include providing axial motion of the multiple material delivery heads along the gantry beam, for example, by using a connecting mechanism such as connecting mechanism 232. The method may provide an individual circumferential position adjustment of each of the material delivery heads in a hoop direction relative to the interior mandrel surface, an individual axial position adjustment of each of the material delivery heads relative to the mandrel surface, individual motion of each of the material delivery heads in a direction normal to the mandrel surface, and individual rotation of each of the material delivery heads about an axis normal to the mandrel surface, for example, by using mechanisms that connect the material delivery heads to the gantry beam—such as connecting mechanism 232 and arm mechanisms 234.

It should be understood, of course, that the foregoing relates to preferred embodiments of the invention and that modifications may be made without departing from the spirit and scope of the invention as set forth in the following claims.

We claim:

1. A device for automated composite lay-up, comprising:
a tool having an axis of rotation and an outside mold surface inside of a mandrel; and
a circular ring surrounding said tool and said mandrel and concentric with said axis of rotation wherein said tool is rotated about said axis of rotation and composite material is delivered directly to said outside mold surface inside of said mandrel;
a gantry beam disposed to access the inside of said mandrel; and
a plurality of material delivery heads supported by said gantry beam, wherein:
said gantry beam provides for movement of said plurality of material delivery heads relative to the outside mold surface; and
at least one of said plurality of material delivery heads has an individually adjustable position relative to the outside mold surface.

2. The device of claim 1, further comprising:
a bearing that contacts said circular ring and supports rotation of said mandrel about said axis of rotation; and
a bearing cradle that holds said bearing and supports the weight of said mandrel.

3. The device of claim 1, further comprising:
a tail stock wherein said gantry beam is supported at one end by said tail stock.

4. The device of claim 1, further comprising:
a connecting mechanism connecting at least one of said plurality of material delivery heads to said gantry beam and providing axial motion of said at least one material delivery head along said gantry beam.

5. The device of claim 1, further comprising:
an arm mechanism connecting at least one of said plurality of material delivery heads to a gantry beam and providing motion of said at least one material delivery head relative to said outside mold surface of said mandrel.

6. The device of claim 1, wherein said gantry beam is supported as a cantilever beam.

7. The device of claim 1, wherein said gantry beam is supported as a cantilever beam using rollers so that said gantry beam is moveable relative to said tool.

8. The device of claim 7, further comprising a tail stock wherein:
said gantry beam is supported at one end by said tail stock; and
said tail stock is moveable with said gantry beam, providing support for said plurality of material delivery heads.

9. A device for automated composite lay-up, comprising:
a tool including a mandrel, wherein said mandrel has an interior mandrel surface that conforms to an outside mold line of a part;
at least one circular ring attached to said tool wherein said circular ring surrounds said tool and said mandrel; and
a bearing that contacts said circular ring wherein said circular ring rotates supported by said bearing so that said tool and said mandrel rotate concentrically with said circular ring about an axis of rotation passing through the center of said circular ring;
a gantry beam disposed to access the inside of said mandrel; and
a plurality of material delivery heads supported by said gantry beam, wherein:
said gantry beam provides for movement of said plurality of material delivery heads relative to said interior mandrel surface; and
at least one of said plurality of material delivery heads has an individually adjustable position relative to said interior mandrel surface.

10. The device of claim 9 wherein said plurality of material delivery heads deliver composite material directly to said outside mold line on said interior mandrel surface.

11. The device of claim 9, further comprising:
a bearing cradle that holds said bearing and supports the weight of said tool.

12. The device of claim 10 wherein said plurality of material delivery heads deliver composite material simultaneously at said interior mandrel surface.

13. The device of claim 9, further comprising:
a connecting mechanism connecting at least one of said plurality of material delivery heads to said gantry beam, wherein:
said connecting mechanism provides axial motion of said at least one material delivery head relative to said interior mandrel surface.

14. The device of claim 9, further comprising:
an arm mechanism connecting at least one of said plurality of material delivery heads to said gantry beam, wherein:
said arm mechanism provides motion of said at least one material delivery head relative to said interior mandrel surface in a direction normal to said interior mandrel surface; and
said arm mechanism provides rotation of said at least one material delivery head relative to said interior mandrel surface about an axis normal to said interior mandrel surface.

15. A device for automated composite lay-up, comprising:
a tool including a mandrel and a circular ring having a center, wherein:
said mandrel has an interior mandrel surface that conforms to an outside mold line of a part;
said circular ring surrounds said mandrel and is attached to said mandrel; and
a bearing cradle including a plurality of bearings wherein:
at least one bearing of said plurality of bearings contacts said circular ring;
said bearing cradle supports the weight of said tool through said plurality of bearings;
said circular ring rotates supported by said bearing so that said mandrel rotates concentrically with said circular ring about an axis of rotation passing through the center of said circular ring;
a gantry beam disposed to access the inside of said mandrel; and
a plurality of material delivery heads supported inside said mandrel by said gantry beam, wherein:
said gantry beam provides for movement of said plurality of material delivery heads relative to said interior mandrel surface; and
at least one of said plurality of material delivery heads has an individually adjustable position relative to said interior mandrel surface.

16. The device of claim 15 wherein:
said gantry beam is cantilever supported; and
said gantry beam is moves axially relative to said tool.

17. The device of claim 15, further comprising:
a connecting mechanism connecting a material delivery head of said plurality of material delivery heads to said gantry beam, wherein:
said connecting mechanism provides axial motion of said material delivery head relative to said interior mandrel surface;
said connecting mechanism provides motion of said material delivery head relative to said interior mandrel surface in a direction normal to said interior mandrel surface; and
said connecting mechanism provides rotation of said material delivery head relative to said interior mandrel surface about an axis normal to said interior mandrel surface.

18. The device of claim 15, further comprising:
an arm mechanism connecting a material delivery head of said plurality of material delivery heads to said gantry beam, wherein:
said arm mechanism provides axial motion of said material delivery head relative to said interior mandrel surface
said arm mechanism provides motion of said material delivery head relative to said interior mandrel surface in a direction normal to said interior mandrel surface; and
said arm mechanism provides rotation of said material delivery head relative to said interior mandrel surface about an axis normal to said interior mandrel surface.

19. The device of claim 15 wherein said bearing cradle is moveable.

20. The device of claim 15, further comprising a tail stock wherein:
said gantry beam is supported by said tail stock during operation of said plurality of material delivery heads; and said tail stock moves with said gantry beam during operation of said plurality of material delivery heads.

21. The device of claim 15 wherein:
said plurality of material delivery heads deliver composite material from inside said interior mandrel surface; and
said plurality of material delivery heads deliver composite material simultaneously.

22. An aircraft part manufacturing device for automated composite lay up, comprising:
a tool including a mandrel and a circular ring having a center, wherein:
    said mandrel has an interior mandrel surface that conforms to an outside mold line of a part;
    said circular ring surrounds said mandrel and is attached to said mandrel;
a bearing cradle including a plurality of bearings wherein:
    at least one bearing of said plurality of bearings contacts said circular ring;
    said bearing cradle supports the weight of said tool through said plurality of bearings;
    said circular ring rotates supported by said bearing so that said mandrel rotates concentrically with said circular ring about an axis of rotation passing through the center of said circular ring;
    said bearing cradle is moveable;
a plurality of material delivery heads that deliver composite material directly to said outside mold line on said interior mandrel surface;
a gantry beam that is cantilever supported, wherein:
    said gantry beam is moveable relative to said tool; and
    said gantry beam supports said plurality of material delivery heads inside said interior mandrel surface of said mandrel; and
a connecting mechanism connecting at least one of said plurality of material delivery heads to said gantry beam, wherein:
    said connecting mechanism provides axial motion of said at least one material delivery head relative to said interior mandrel surface;
    said connecting mechanism provides motion of said at least one material delivery head relative to said interior mandrel surface in a direction normal to said interior mandrel surface;
    said connecting mechanism provides rotation of said at least one material delivery head relative to said interior mandrel surface about an axis normal to said interior mandrel surface.

* * * * *